(12) United States Patent
Uto et al.

(10) Patent No.: US 6,549,198 B1
(45) Date of Patent: Apr. 15, 2003

(54) HOUT POSITION CONTROL CIRCUIT

(75) Inventors: Yoshiyuki Uto, Kanagawa (JP);
Takafumi Esaki, Kanagawa (JP);
Hiroshi Furukawa, Kanagawa (JP);
Yasuhiro Fukuda, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/456,816

(22) Filed: Dec. 8, 1999

(30) Foreign Application Priority Data

Dec. 8, 1998 (JP) .......................................... 10-348202

(51) Int. Cl.⁷ ................................................. G09G 5/00
(52) U.S. Cl. ....................... 345/213; 345/204; 348/500; 348/540; 348/541; 348/497
(58) Field of Search ................................ 345/213, 204; 348/500, 540, 541, 497

(56) References Cited

U.S. PATENT DOCUMENTS

| 4,327,376 | A | * | 4/1982 | Balaban et al. ............. 358/159 |
|---|---|---|---|---|
| 4,803,407 | A | * | 2/1989 | Mehrgardt ................... 315/364 |
| 5,043,813 | A | * | 8/1991 | Christopher ................. 358/148 |
| 5,150,201 | A | * | 9/1992 | Mehrgardt et al. ............. 348/23 |
| 5,329,367 | A | * | 7/1994 | Fernsler et al. ............. 348/540 |
| 5,565,928 | A | * | 10/1996 | Saeger et al. ............... 348/540 |
| 5,812,210 | A | * | 9/1998 | Arai et al. .................. 348/555 |

FOREIGN PATENT DOCUMENTS

| JP | 56-98122 | 7/1981 |
| JP | 61-76911 | 5/1986 |
| JP | 62-216588 | 9/1987 |

* cited by examiner

Primary Examiner—Amare Mengistu
Assistant Examiner—Jimmy H. Nguyen
(74) Attorney, Agent, or Firm—Sughrue Mion, PLLC

(57) ABSTRACT

Disclosed is a HOUT position control circuit used to control the horizontal position of display image in a multisync monitor. The circuit has: a first PLL circuit that is phase-locked with input horizontal synchronous signal; a second PLL circuit that is phase-locked with output of the first PLL circuit; and a circuit for generating a delay between outputs of the first PLL circuit and the second PLL circuit to control the delay amount from the input horizontal synchronous signal to output horizontal drive signal.

13 Claims, 5 Drawing Sheets

HOUT POSITION CONTROL CIRCUIT

FIELD OF THE INVENTION

This invention relates to a HOUT position control circuit used to control position where image is displayed in a display.

BACKGROUND OF THE INVENTION

Multisync monitors use a HOUT position control circuit to control the delay amount from input horizontal synchronous signal (hereinafter referred to as 'Hsync signal') to output horizontal drive signal (hereinafter referred to as 'Hout signal') so as to conduct the control of image display position (hereinafter referred to as 'position control').

Conventionally, in the HOUT position control circuit of multisync monitors, an adjustable delay circuit is provided in PLL loop, and the position control is conducted by controlling the delay value of the adjustable delay circuit.

FIG. 1 is a block diagram showing the composition of a conventional HOUT position control circuit.

As shown in FIG. 1, the conventional HOUT position control circuit is provided with adjustable delay circuits 24, 25 at the input stage of a phase comparator 3. Two input signals to the phase comparator 3 are separately delayed by the adjustable delay circuits 24, 25. The position control is conducted by controlling the delay value.

FIG. 2 is a block diagram showing the composition of the adjustable delay circuits 24, 25 in FIG. 1.

Multisync monitors need the delay amount to be a same proportion to input Hsync signal. Therefore, sawtooth wave 31 synchronized with input signal 29 of the adjustable delay circuits 24, 25 is generated by a sawtooth generator circuit 28, and then delayed output signal 27 is made by using a comparator 32.

The control of delay value is conducted by using delay control voltage 30, which is DC voltage.

FIG. 3 is a timing chart showing the process of generating a delay value from sawtooth wave.

However, since the conventional HOUT position control circuit has the adjustable delay circuit in PLL loop, a dispersion in the adjustable delay circuit may cause a deviation in position.

Further, since the adjustable delay circuit is operated in analogue manner, the delay value may vary depending on a noise thereby causing a jitter.

SUMMARY OF THE INVENTION

Accordingly, it is an object of the invention to provide a HOUT position control circuit that can suppress a deviation in position or a jitter.

It is a further object of the invention to provide a position control circuit used to control the vertical position of display image in a multisync monitor that can suppress a deviation in position or a jitter.

According to the invention, a HOUT position control circuit used to control the horizontal position of display image in a multisync monitor, comprises:

a first PLL circuit that is phase-locked with input horizontal synchronous signal;

a second PLL circuit that is phase-locked with output of the first PLL circuit; and means for generating a delay between outputs of the first PLL circuit and the second PLL circuit to control the delay amount from the input horizontal synchronous signal to output horizontal drive signal.

According to another aspect of the invention, a HOUT position control circuit used to control the horizontal position of display image in a multisync monitor, comprises:

the position control of display image is conducted in digital manner.

According to another aspect of the invention, a position control circuit used to control the vertical position of display image in a multisync monitor, comprises:

a first PLL circuit that is phase-locked with input vertical synchronous signal;

a second PLL circuit that is phase-locked with output of the first PLL circuit; and means for generating a delay between outputs of the first PLL circuit and the second PLL circuit to control the delay amount from the input vertical synchronous signal to output vertical drive signal.

According to another aspect of the invention, a position control circuit used to control the vertical position of display image in a multisync monitor, comprises:

the position control of display image is conducted in digital manner

Also, the invention offers a multisync monitor using the above-composed HOUT position control circuit or a position control circuit.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
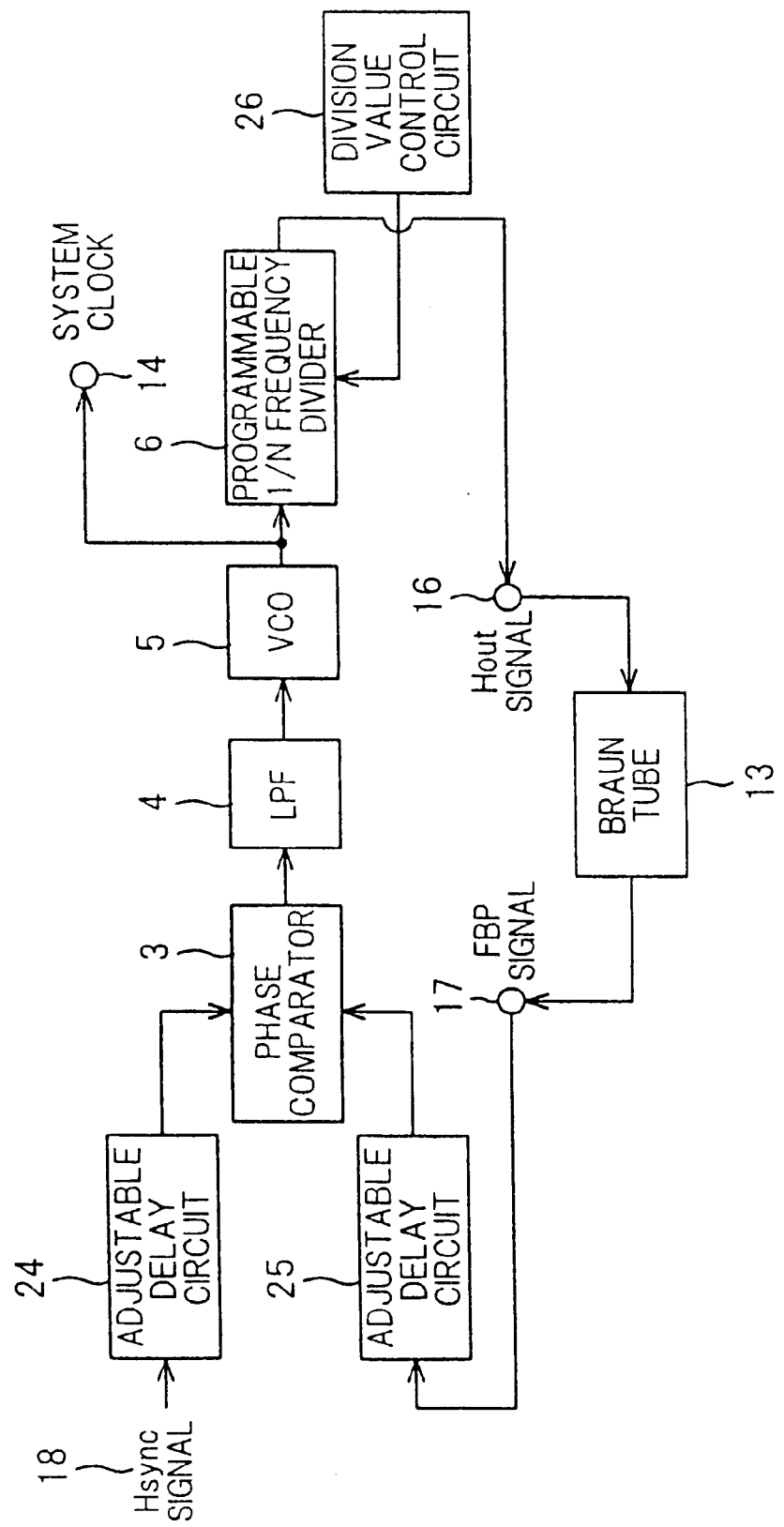
FIG. 1 is a block diagram showing the conventional HOUT position control circuit.
Figure 2:
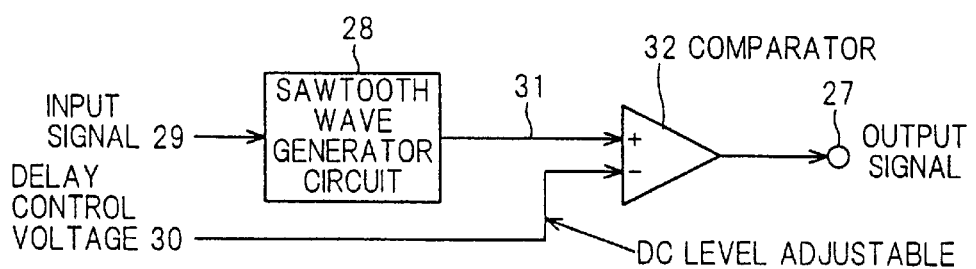
FIG. 2 is a block diagram showing an adjustable delay circuit in FIG. 1.
Figure 3:
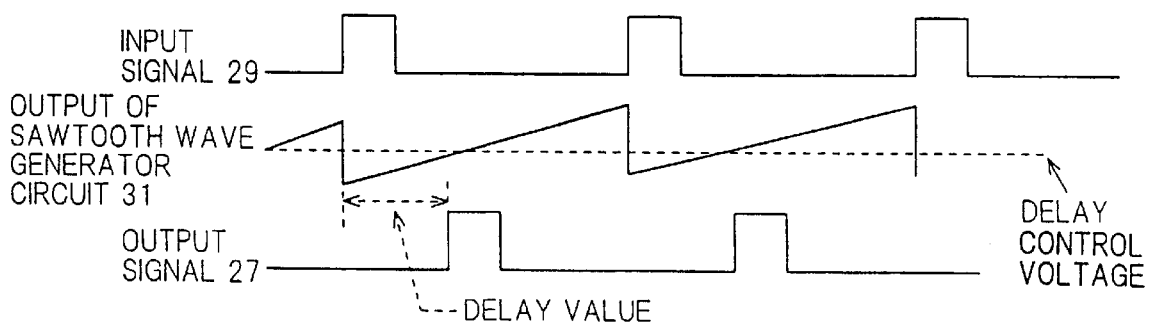
FIG. 3 is a timing chart showing the process of generating a delay value from sawtooth wave.

The preferred embodiments of the invention will be explained below referring to the drawings.

Figure 4:
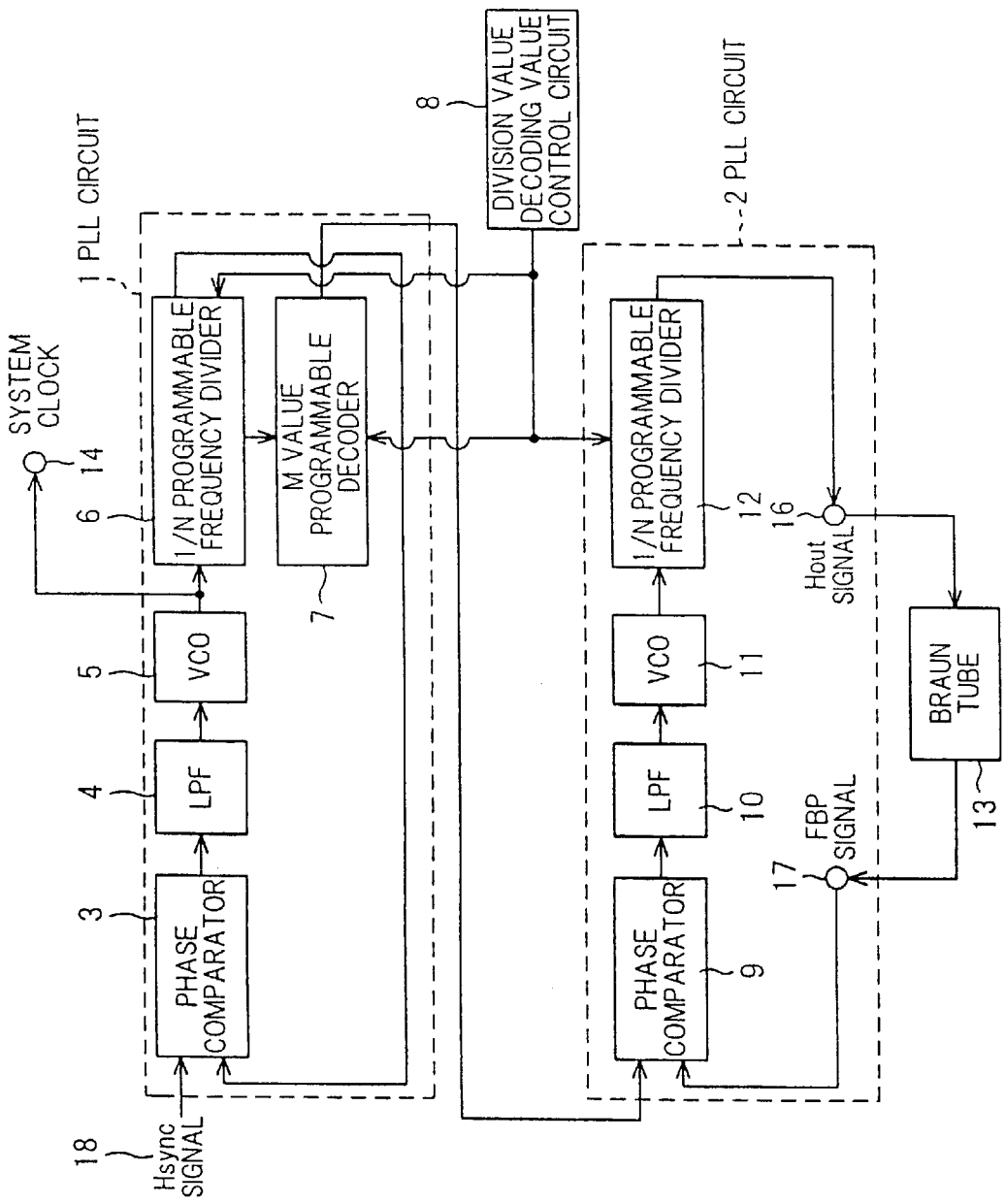
FIG. 4 is a block diagram showing a HOUT position control circuit in a preferred embodiment according to the invention.

FIG. 4 is a block diagram showing a HOUT position control circuit in the preferred embodiment according to the invention.

In FIG. 4, a PLL circuit 1 is used to match the phase to Hsync signal 18 to be input and a PLL circuit 2 is used to match the phase to the output of a M value programmable decoder 7 of the PLL circuit 1.

The components of the PLL circuits 1 and 2 are explained below.

Hsync signal 18 is input to a phase comparator 3 of the PLL circuit 1, where it is phase-compared with the output of a 1/N programmable frequency divider 6. Then, error output, I.e. output of the phase comparator 3, is smoothed by LPF 4. By the output voltage of the LPF 4, the oscillation frequency of VCO 5 is controlled.

The 1/N programmable frequency divider 6 is used to change a frequency-division value N by the frequency of Hsync signal 18 to be input. A frequency-division value N is a positive integer and is set by a division value decoding value control circuit 8.

For Hsync signal 18 to be input, system clock 14 phase-locked can be produced. The system clock 14 is used as a system clock to control the division value decoding value control circuit 8, Hsync signal, vertical synchronous signal (hereinafter referred to as 'Vsync signal') etc.

Figure 5:
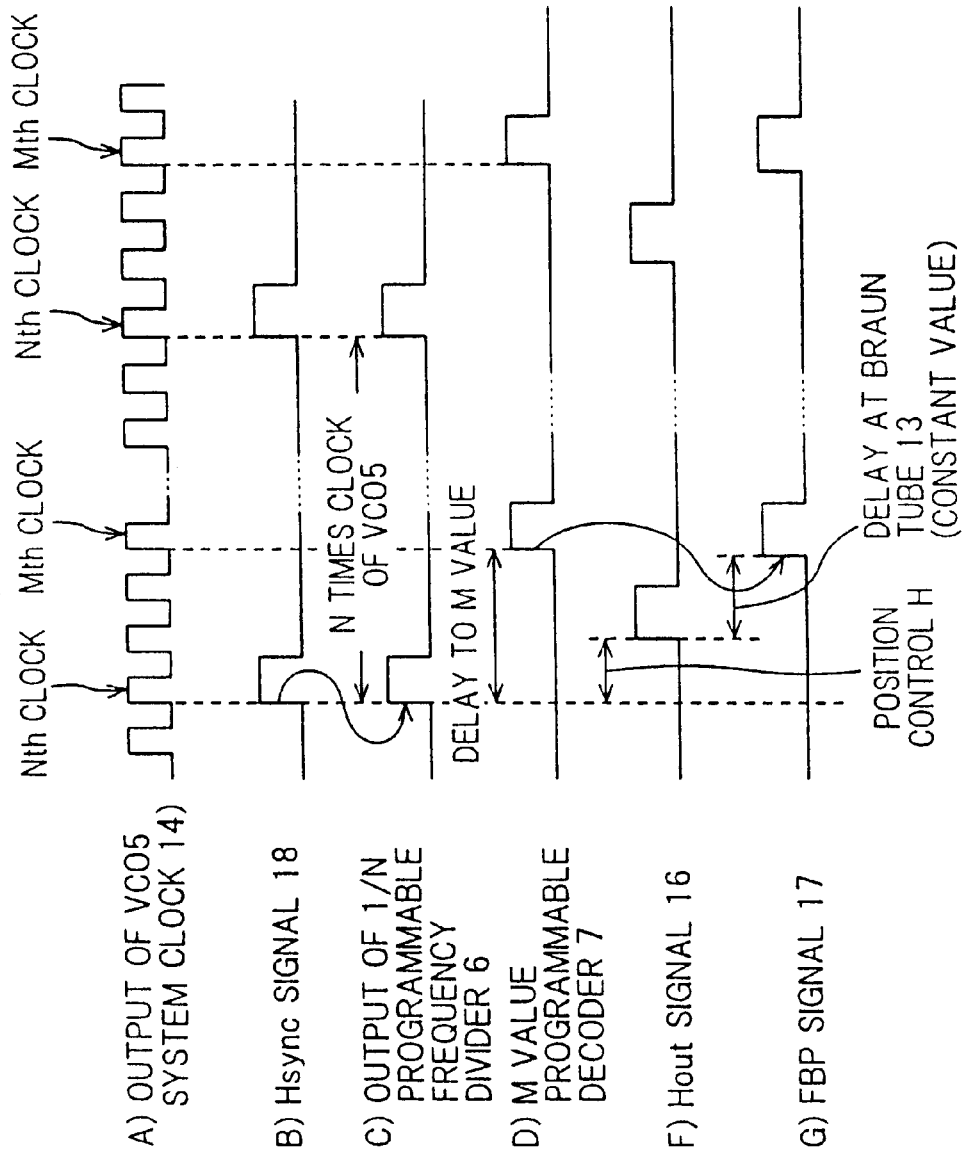
FIG. 5 is a timing chart showing the operation of the HOUT position control circuit in FIG. 4.

An M value programmable decoder 7, described later in FIG. 5, is used to decode the $M_{th}$ clock of the 1/N programmable frequency divider 6. The decode value M, where M is an integer, is set by the division value decoding value control circuit 8 when conducting the position control.

Also in the PLL circuit 2, output of the M value programmable decoder 7 is phase-compared with FBP signal 17 generated in a Braun tube 13 by a phase comparator 9, and then error output, i.e. output of the phase comparator 9, is smoothed by LPF 10. By the output voltage of the LPF 10, the oscillation frequency of VCO 11 is controlled.

The frequency-division value N of a 1/N programmable frequency divider 12 is set to have the same value as the 1/N programmable frequency divider 6 in the PLL circuit 1. Output of the 1/N programmable frequency divider 12 is used as Hout signal 16 in the Braun tube 13.

The Hout position control operation in this embodiment is explained below.

At first, the operation of PLL circuits 1 and 2 is explained in FIG. 5. The PLL circuit conducts the phase-locked oscillation to Hsync signal 18 to be input, by using the phase comparator 3, LPF 4, VOC 5 and 1/N programmable frequency divider 6.

Hereupon, the frequency-division ratio of the 1/N programmable frequency divider 6 is set by the division value decoding value control circuit 8 based on the frequency of Hsync signal 18. In general, the division value decoding value control circuit 8 is composed of microcomputer, DSP etc.

In FIG. 5, B) indicates Hsync signal 18 to be input, C) indicates output of the 1/N programmable frequency divider 6, and A) indicates the timing of system clock 14 as the output of the VCO 5.

Since Hsync signal 18 is phase-locked with the output of the 1/N programmable frequency divider 6, they have the same timing. System clock 14 as the output of the VCO 5 corresponds to a frequency N times Hsync signal 18.

Also in the PLL circuit 2, the output of the M value programmable decoder 7 as input signal is phase-locked with FBP signal 17.

The position control operation is explained below.

The M value programmable decoder 7, which is synchronized with the 1/N programmable frequency divider 6, outputs a pulse at an arbitrary count value M of the 1/N programmable frequency divider 6.

In FIG. 5, C) and D) indicate the output of the 1/N programmable frequency divider 6 and the M value programmable decoder 7, respectively.

The output D) of the M value programmable decoder 7 has a delay corresponding to M value set by the division value decoding value control circuit 8, and outputs periodically the same signal as the output of the 1/N programmable frequency divider 6.

The output D) of the M value programmable decoder 7 is phase-locked with FBP signal 17 by the PLL circuit 2. Delay from Hout signal 16 to FBP signal 17 is a constant value determined by the Braun tube 13.

The delay amount H from Hsync signal 18 to Hout signal 16 can be set by changing the M value of the M value programmable decoder 7.

Accordingly, the control of delay amount H from Hsync signal 18 to Hout signal 16, i.e. position control, can be performed by controlling the M value of the M value programmable decoder 7.

Thus, in this embodiment, the position control can be performed if only setting the M value of the M value programmable decoder 7 in digital manner. Therefore, a conventional adjustable delay circuit for position control that is provided at the input of the phase comparator is not necessary any more.

The position control circuit in the embodiment can solve the problem that a fluctuation in delay value occurred in the adjustable delay circuit due to a noise etc. causes a jitter to affect the quality of image. Also, it can solve the problem that a dispersion in the adjustable delay circuit causes a deviation in position.

Also, in this embodiment, since the position control can be conducted in digital manner, pin valance correction, key balance correction etc. needed for the multisync monitor can be performed by controlling the M value set by the division value decoding value control circuit 8.

Another preferred embodiment of the invention is explained below referring to the drawings.

Figure 6:
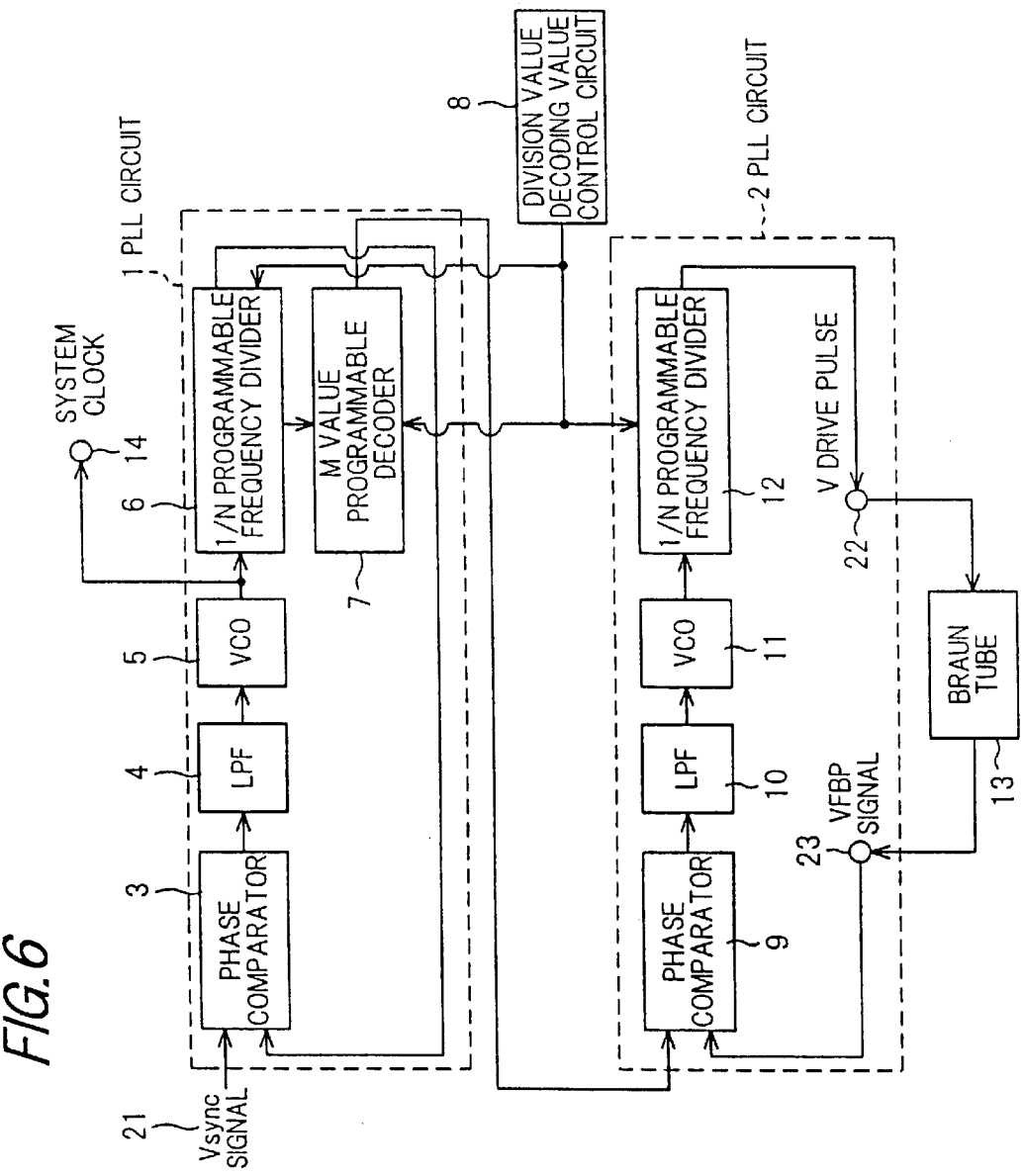
FIG. 6 is a block diagram showing a position control circuit for Vsync signal in another preferred embodiment according to the invention.

FIG. 6 is a block diagram showing a position control circuit for Vsync signal according the invention.

In FIG. 6, except that Vsync signal 21 is input signal, V drive pulse 22 is a drive pulse output to the Braun tube 13 and VFBP 23 is FBP from the Braun tube 13, the circuit composition is the same as that in the embodiment in FIG. 4. The explanation of common components is omitted herein.

In this embodiment, like the embodiment in FIG. 4, for Vsync signal 21, the position control can be performed using the value of the M value programmable decoder 7.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A horizontal drive (HOUT) position control circuit used to control the horizontal position of a display image in a multisync monitor, comprising:

a division value decoding value control circuit having an output signal that is determined from a frequency of a horizontal synchronous signal, wherein said output signal includes a frequency division value and a decoding count value;

a first phase lock loop (PLL) circuit that includes a first programmable frequency divider and a programmable decoder, said first PLL circuit is adapted to receive the horizontal synchronous signal and an output of said first programmable frequency divider, said first PLL circuit being phase-locked with the input horizontal synchronous signal;

a second PLL circuit that is adapted to receive a signal from said programmable decoder and the frequency division value from said division value decoding value control circuit, said second PLL circuit being phase-locked with said programmable decoder output signal, wherein said programmable decoder output signal has a delay corresponding to the decoding count value of said first programmable frequency divider output signal; and means for generating a delay between outputs of said first PLL circuit and said second PLL circuit to control the delay amount from said input horizontal synchronous signal to output a horizontal drive signal, wherein the delay amount and setting precision can be controlled by setting the frequency division value and the decoding count value.

2. A horizontal drive (HOUT) position control circuit used to control the horizontal position of a display image in a multisync monitor according to claim 1, wherein said means for generating a delay between outputs of said first PLL circuit and said second PLL circuit is conducted in a digital manner.

3. A horizontal drive (HOUT) position control circuit used to control the horizontal position of a display image in a multisync monitor according to claim 1, wherein the first PLL circuit includes a first phase comparator that compares the phase of the horizontal synchronous signal and the output of the first programmable frequency divider.

4. A horizontal drive (HOUT) position control circuit used to control the horizontal position of a display image in a multisync monitor according to claim 3, herein the first PLL circuit includes a first low pass filter for smoothing an error output of said first phase comparator.

5. A horizontal drive (HOUT) position control circuit used to control the horizontal position of a display image in a multisync monitor according to claim 4, wherein the first PLL circuit includes a first voltage control oscillation circuit that controls a first oscillation frequency in accordance with an output voltage of said first low pass filter, an output of said first voltage control oscillation circuit being input to said first programmable frequency divider.

6. A position control circuit used to control the vertical position of a display image in a multisync monitor, comprising:

a division value decoding value control circuit having an output signal that is determined from a frequency of a vertical synchronous signal, wherein said output signal includes a frequency division value and a decoding count value;

a first phase lock loop (PLL) circuit that includes a first programmable frequency divider and a programmable decoder, said first PLL circuit is adapted to receive the vertical synchronous signal and an output of said first programmable frequency divider, said first PLL circuit being phase-locked with the input vertical synchronous signal;

a second PLL circuit that is adapted to receive a signal from said programmable decoder and the frequency division value from said division value decoding value control circuit, said second PLL circuit being phase-locked with said programmable decoder output signal, wherein said programmable decoder output signal has a delay corresponding to the decoding count value of said first programmable frequency divider output signal; and means for generating a delay between outputs of said first PLL circuit and said second PLL circuit to control the delay amount from said input vertical synchronous signal to output a vertical drive signal, wherein the delay amount and setting precision can be controlled by setting the frequency division value and the decoding count value.

7. A position control circuit used to control the vertical position of a display image in a multisync monitor according to claim 6, wherein said means for generating a delay between outputs of said first PLL circuit and said second PLL circuit is conducted in a digital manner.

8. A multisync monitor having a horizontal drive (HOUT) position control circuit comprising:

a division value decoding value control circuit having an output signal that is determined from a frequency of a horizontal synchronous signal, wherein said output signal includes a frequency division value and a decoding count value;

a first phase lock loop (PLL) circuit that includes a first programmable frequency divider and a programmable decoder, said first PLL circuit is adapted to receive the horizontal synchronous signal and an output of said first programmable frequency divider, said first PLL circuit being phase-locked with the input horizontal synchronous signal;

a second PLL circuit that is adapted to receive a signal from said programmable decoder and the frequency division value from said division value decoding value control circuit, said second PLL circuit being phase-locked with said programmable decoder output signal, wherein said programmable decoder output signal has a delay corresponding to the decoding count value of said first programmable frequency divider output signal; and means for generating a delay between outputs of said first PLL circuit and said second PLL circuit to control the delay amount from said input horizontal synchronous signal to output a horizontal drive signal, wherein the delay amount and setting precision can be controlled by setting the frequency division value and the decoding count value.

9. A multisync monitor having a horizontal drive (HOUT) position control circuit according to claim 8, wherein said means for generating a delay between outputs of said first PLL circuit and said second PLL circuit is conducted in a digital manner.

10. A multisync monitor having a position control circuit comprising:

a division value decoding value control circuit having an output signal that is determined from a frequency of a vertical synchronous signal, wherein the output signal includes a frequency division value and a decoding count value;

a first phase lock loop (PLL) circuit that includes a first programmable frequency divider and a programmable decoder, said first PLL circuit is adapted to receive the vertical synchronous signal and an output of said first programmable frequency divider, said first PLL circuit being phase-locked with the input vertical synchronous signal;

a second PLL circuit that is adapted to receive a signal from said programmable decoder and the frequency division value from said division value decoding value control circuit, said second PLL circuit being phase-locked with said programmable decoder output signal, wherein said programmable decoder output signal has a delay corresponding to the decoding count value of said first programmable frequency divider output signal; and means for generating a delay between outputs of said first PLL circuit and said second PLL circuit to control the delay amount from said input vertical synchronous signal to output a vertical drive signal, wherein the delay amount and setting precision can be controlled by setting the frequency division value and the decoding count value.

11. A multisync monitor having a position control circuit according to claim 10, wherein said means for generating a delay between outputs of said first PLL circuit and said second PLL circuit is conducted in a digital manner.

12. A horizontal drive (HOUT) position control circuit used to control the horizontal position of a display image in a multisync monitor, which controls a delay amount from an input horizontal synchronous signal to an output horizontal drive signal, comprising:

a first PLL circuit including:
  a first programmable frequency divider for changing a first frequency division value in accordance with a frequency of said input horizontal synchronous signal,
  a first phase comparator for comparing said input horizontal synchronous signal with an output signal of said first programmable frequency divider,
  a first low pass filter for smoothing an output of said first phase comparator,
  a first voltage control oscillation circuit for controlling a first oscillation frequency in accordance with an output voltage of said first low pass filter, an output of said first voltage control oscillation circuit being input to said first programmable frequency divider, and
  a programmable decoder for outputting a pulse at an arbitrary count value of said first programmable frequency divider;

a second PLL circuit including:
  a second phase comparator for comparing an output of said programmable decoder with a flyback pulse signal output from a Braun tube,
  a second low pass filter for smoothing an output of said second phase comparator,
  a second voltage control oscillation circuit for controlling a second oscillation frequency in accordance with an output voltage of said second low pass filter,
  a second programmable frequency divider to which an output of said second voltage control oscillation circuit is input; and
  a division value decoding value control circuit for setting said frequency division value of said first programmable frequency divider, a decoding value of said programmable decoder, and a second frequency division value of said second programmable frequency divider, respectively;

wherein said horizontal position control is conducted by using said decoding value of said programmable decoder.

13. A position control circuit used to control the vertical position of a display image in a multisync monitor, comprising:

a first PLL circuit including:
  a first programmable frequency divider for changing a first frequency division value in accordance with a frequency of a vertical synchronous signal,
  a first phase comparator for comparing the vertical synchronous signal with an output signal of said first programmable frequency divider,
  a first low pass filter for smoothing an output of said first phase comparator,
  a first voltage control oscillation circuit for controlling a first oscillation frequency in accordance with an output voltage of said first low pass filter, an output of said first voltage control oscillation circuit being input to said first programmable frequency divider, and
  a programmable decoder for outputting a pulse at an arbitrary count value of said first programmable frequency divider;

a second PLL circuit including:
  a second phase comparator for comparing an output of said programmable decoder with a flyback pulse signal output from a Braun tube,
  a second low pass filter for smoothing an output of said second phase comparator,
  a second voltage control oscillation circuit for controlling a second oscillation frequency in accordance with an output voltage of said second low pass filter,
  a second programmable frequency divider to which an output of said second voltage control oscillation circuit is input; and
  a division value decoding value control circuit for setting said frequency division value of said first programmable frequency divider, a decoding value of said programmable decoder, and a second frequency division value of said second programmable frequency divider, respectively;

wherein said vertical position control is conducted by using said decoding value of said programmable decoder.

* * * * *